US012726539B1

(12) United States Patent
Zhang et al.

(10) Patent No.: US 12,726,539 B1

(45) Date of Patent: Sep. 1, 2026

(54) GATEWAY DEVICE INTEGRATIONS FOR MONITORED ASSETS

(71) Applicant: Samsara Inc., San Francisco, CA (US)

(72) Inventors: Jennifer Zhang, San Francisco, CA (US); Anna Klaussen, San Francisco, CA (US); Christopher Mozzocchi, Denver, CO (US); Mark Bennett, Oakland, CA (US)

(73) Assignee: Samsara Inc., San Francisco, CA (US)

(*) Notice: Subject to any disclaimer, the term of this patent is extended or adjusted under 35 U.S.C. 154(b) by 0 days.

(21) Appl. No.: 17/930,769

(22) Filed: Sep. 9, 2022

Related U.S. Application Data

(60) Provisional application No. 63/358,591, filed on Jul. 6, 2022.

(51) Int. Cl.

*H04L 12/46* (2006.01)
*H04L 67/025* (2022.01)
*H04L 67/1095* (2022.01)

(52) U.S. Cl.

CPC .......... *H04L 67/1095* (2013.01); *H04L 12/46* (2013.01); *H04L 67/025* (2013.01)

(58) Field of Classification Search

CPC ... H04L 67/1095; H04L 12/46; H04L 67/025; G06Q 40/06; G06Q 10/087; G06Q 10/08

See application file for complete search history.

(56) References Cited

U.S. PATENT DOCUMENTS

| | | | | |
|---|---|---|---|---|
| 11,989,774 | B1 * | 5/2024 | Cutting | G06Q 40/03 |
| 2004/0133398 | A1 | 7/2004 | Merkin et al. | |
| 2008/0086685 | A1 * | 4/2008 | Janky | G06Q 10/087 715/700 |
| 2014/0114448 | A1 * | 4/2014 | Outwater | B60L 53/14 700/286 |
| 2016/0117594 | A1 | 4/2016 | Perez Ramos et al. | |
| 2021/0377006 | A1 * | 12/2021 | Chau | H04L 9/3297 |
| 2022/0067855 | A1 * | 3/2022 | Dawson-Haggerty | H04W 12/08 |

FOREIGN PATENT DOCUMENTS

| | | | |
|---|---|---|---|
| KR | 20180070953 | A | 6/2018 |

* cited by examiner

*Primary Examiner* — Marcus Smith
*Assistant Examiner* — Zhaohui Yang

(57) ABSTRACT

In various implementations, an asset data service receives data sourced from a gateway device onboard a monitored asset. The asset data service persists the data to a datastore associated with the gateway device. The asset data service identifies a manifest that specifies an integration of at least a subset of the data with other data sourced by one or more other gateway devices onboard the monitored asset. The asset data service then integrates the subset of the data and the other data into the integrated dataset based at least on the manifest.

20 Claims, 10 Drawing Sheets

FIGURE 3
300
RECEIVE DATA FROM GATEWAY DEVICE
301
PERSIST DATA TO DATASTORE
303
IDENTIFY MANIFEST SPECIFYING DATA INTEGRATION
305
INTEGRATE SUBSET OF DATA AND OTHER DATA INTO INTEGRATED DATASET
307

GATEWAY DEVICE 121

GATEWAY DEVICE 123

GATEWAY DEVICE 133

THIRD-PARTY SERVICE 140

ASSET DATA SERVICE 101

CLIENT DEVICE 110 configure manifest telemetry data (gw-a)

persist/ integrate telemetry data (gw-b)

persist/ integrate telemetry data (gw-c)

persist integrated view display: gw-c, gw-λ

GATEWAY DEVICE INTEGRATIONS FOR MONITORED ASSETS

CROSS REFERENCE TO RELATED APPLICATION

This application claims priority to and benefit from U.S. Provisional Patent Application No. 63/358,591 titled "Gateway Device Integrations For Monitored Assets" filed on Jul. 6, 2022, which is expressly incorporated by reference herein.

TECHNICAL FIELD

Aspects of the disclosure are related to the field of computing and data management technology and, in particular to, asset gateway integration capabilities.

BACKGROUND

Asset gateways provide organizations with the ability to monitor and manage their assets such as vehicles, airborne assets, industrial equipment, and the like. In a typical example, a gateway device connects to onboard systems of a vehicle or other such asset. The gateway device gathers data from the asset and continuously, periodically, or at some other interval uploads telemetry data to an asset gateway service. An organization associated with the asset can login to the gateway service to view the system data in the context of a real-time dashboard or other such environment.

In some cases, multiple gateway devices may monitor a single asset. For example, a leased vehicle may have an original equipment manufacturer (OEM) gateway device installed, as well as a gateway device associated with an asset data service. The gateway devices will each transmit their telemetry data to their respective services which can be accessed and viewed through their respective user experience.

Some solutions provide an integration that allows asset data sourced by two different gateway devices to be collected by a single service. For example, the asset data service mentioned above may include an integration that allows asset data collected by the OEM gateway device to be uploaded to the asset data service. An end-user may thus view both streams of data: the stream produced by the gateway device associated with the asset data service, as well as the stream produced by the OEM gateway device.

Unfortunately, such integrations can lead to a cluttered and inefficient user experience because the data streams from a single monitored asset often yield duplicative or redundant data. For example, a typical user experience may include a list of gateway devices managed by an organization displayed in a 1:1 association with their monitored assets. A single asset monitored by two gateway devices would be displayed twice, potentially giving the impression that two assets exist instead of one, or generally causing confusion or irritation.

Overview

Technology is proposed herein that improves access to telemetry data produced by asset gateway devices by of an integration of the data. The integrated data may be displayed as-if it were sourced from a single gateway device, thereby improving the user experience and overall efficiency of such solutions.

In an implementation, an asset data service receives data sourced from a gateway device onboard a monitored asset. The asset data service persists the data to a datastore associated with the gateway device. The asset data service identifies a manifest that specifies an integration of at least a subset of the data with other data sourced by one or more other gateway devices onboard the monitored asset. The asset data service then integrates the subset of the data and the other data into the integrated dataset based at least on the manifest.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure may be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several implementations are described in connection with these drawings, the disclosure is not limited to the implementations disclosed herein. On the contrary, the intent is to cover all alternatives, modifications, and equivalents.

DETAILED DESCRIPTION

Figure 1:
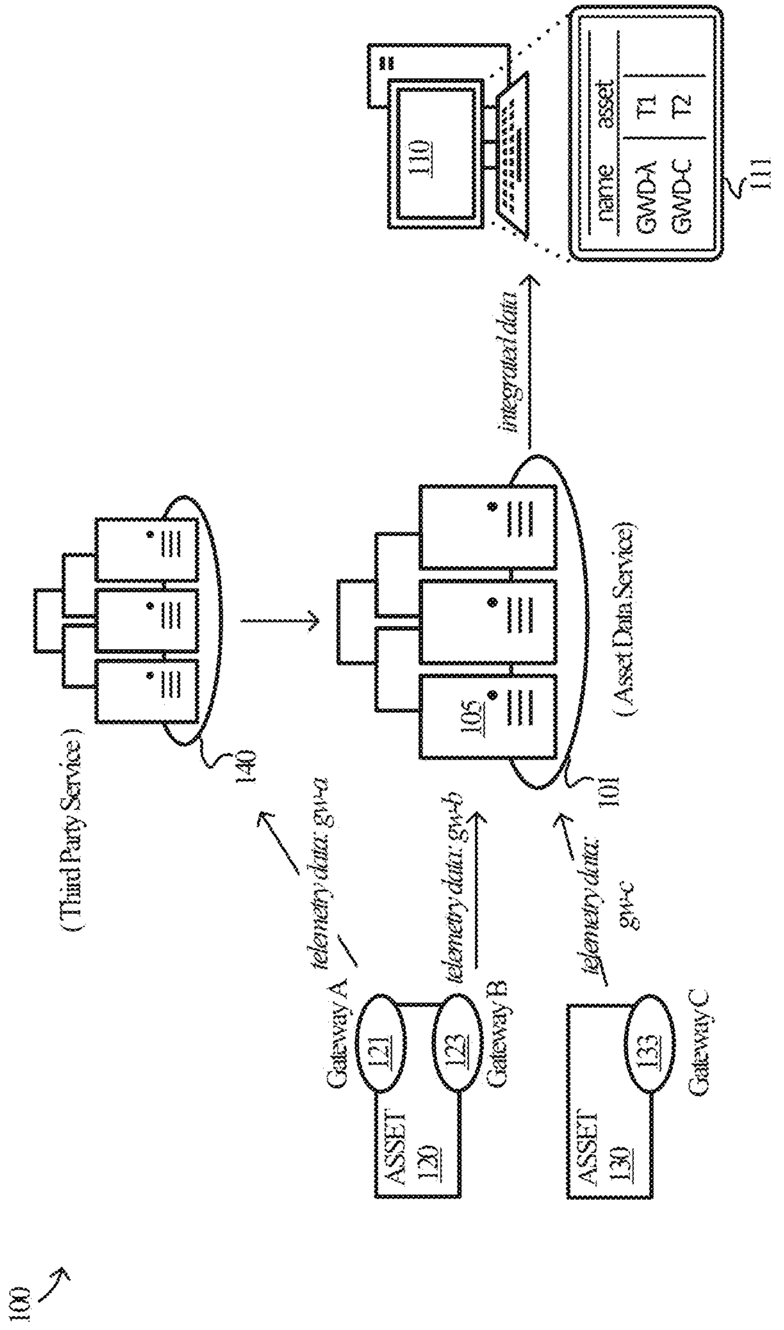
FIG. 1 illustrates an operational environment in an implementation.

Technology is proposed herein that improves access to asset gateway data through gateway "integration" such that data sourced from multiple gateways with respect to a single monitored asset can be viewed and otherwise utilized as-if the data had been sourced from a single gateway. In various implementations, an asset data service receives data sourced from a gateway device onboard a monitored asset and persists the data to a datastore associated with the gateway device. The service identifies a manifest that specifies an integration of at least a subset of the data with other data sourced by one or more other gateway devices onboard the monitored asset. The service then proceeds to integrate the subset of the data and the other data into the integrated dataset based at least on the manifest.

The asset data service may integrate the data sourced from the multiple gateways in a variety of ways. In one example referred to as a "write-path" integration, the service integrates the data as it is being written to one or more datastores. For instance, the service may write the data sourced from one gateway to its own datastore, while writing the data stored by another gateway to its own datastore, while writing an integrated version of the data to a third datastore. The integrated data may then be pulled at runtime upon request from the third datastore to be displayed in an integrated manner in the context of a user interface or other such environment.

In another example of the write-path integration, data from one gateway may be persisted to its own datastore. However, the service may refrain from writing the data sourced from the second gateway. Instead, the service may integrate the two data streams and stored the integrated version of the data in its own datastore. In such a scenario, only two datastores are needed to store the data—the data from the first gateway, and the integrated version of the data. As with the first write-path example, the integrated data may be pulled from the third datastore at runtime and upon request to be displayed in an integrated manner in the context of a user interface or other such environment.

In another variation of the write-path technique, the two datasets may be integrated immediately and stored in a dedicated datastore, without storing either the first data stream or the second data stream in a persistent manner. In other words, only one datastore need be maintained. The single datastore may then be accessed by the service in response to a request by a client device for the integrated data.

In an alternative example that illustrates a "read-path" integration, the service writes the different data streams to their own respective datastores. Then, at runtime when an integrated view is requested, the service retrieves the data from their respective datastores, integrates it on-the-fly per the manifest, and supplies the integrated data for display in a user interface.

In these and other implementations, the asset data service may generate an integrated view of the gateway device and the one or more other gateway devices. The integrated view may comprise a single record for a single gateway device that includes at least a portion of the integrated dataset.

In a brief example, an asset data service receives telemetry data from two vehicles gateways onboard a vehicle. In an implementation, the gateways may include an OEM gateway integrated into a vehicle computer system and another gateway device operatively connected to the vehicle systems and associated with an asset data service. The OEM gateway transmits its data to a third-party service associated with the OEM, while the other gateway device transmits its data to the asset data service. An integration between the OEM service and the asset data service allows the data sourced from the OEM gateway to be uploaded to the asset data service. Thus, the asset data service receives both the data produced by its own gateway, as well as the data produced by the OEM gateway.

The asset data service receives the data logs both directly from its own gateway, as well as via an integration channel with the OEM-affiliated service. The asset data service processes each log on an individual basis as it is received. For each log, the service determines how to process the log based on an integration manifest configured by an end-user, e.g., a customer of the asset data service. Depending upon the specific integration, a given log may be written to one or more of a datastore associated with its source gateway device and an integrated datastore that holds an integration of data sourced from multiple datastores. The integration manifest may also detail which portions of the data in each log is persisted to which datastore.

Referring now to the drawings, FIG. 1 illustrates operational environment 100 in an implementation. Operational environment 100 includes asset data service 101, third-party service 140, assets 120 and 130, and client device 110. Asset 120 includes gateway devices 121 and 123. Asset 130 includes gateway device 133. (Gateway devices 121, 123, and 133 are referred to hereinafter as gateways 121, 123, and 133.) Dashboard view 111 is displayed on client device 110.

Figure 7:
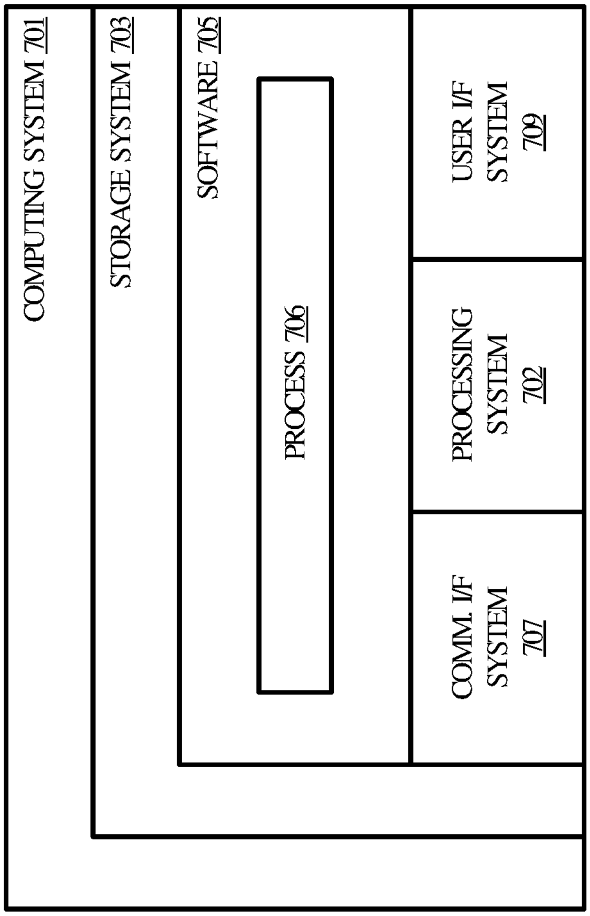
FIG. 7 illustrates a computing system suitable for implementing the various operational environments, architectures, processes, scenarios, and sequences discussed below with respect to the other Figures.

Asset data service 101 is representative of one or more services (including microservices) capable of interfacing with asset gateway devices, as well as third-party services and end-user devices to provide the data integrations described herein. Asset data service 101 is further representative of any service capable of interfacing with gateways to receive telemetry data, and of storing, processing, and providing the telemetry data to customers or other such entities. Asset data service 101 may be implemented in the context of one or more data centers and one or more computing devices, of which computing device 700 in FIG. 7 is representative.

Gateway device 121 is representative of an external or embedded gateway device capable of communicating telemetry data from a monitored asset to a third-party data service. Gateway devices 123 and 133 are each representative of external or embedded gateway devices capable of communicating telemetry data produced by a monitored asset to an asset data service. The asset gateway devices may communicate via wireless connections to one or more networks that provided connectivity to their respective services.

In operation, gateways 123 and 133 interface with various elements of assets 120 and 130 to obtain telemetry data that is reported to asset data service 101. Gateway 121 interfaces with various elements of asset 120 to obtain telemetry which is reported to third-party service 140. Examples of telemetry data provided by gateways 121, 123, and 133 include global positioning system (GPS) location data, engine diagnostics, fuel efficiency data, image data, video data, vehicle analytics data, operator data, workflow data, and the like. Gateways 121, 123, and 133 may transmit telemetry data in log messages.

Asset data service 101 employs an integration process by which telemetry data from gateways 121 and 123 of asset 120 are integrated for storage and/or presentation on client device 110. Asset data service 101 obtains telemetry data from gateways 123 and 133 obtained from assets 120 and 130, respectively, then processes the telemetry data received from gateway 121 (via third-party service 140) according to a manifest. Asset data service 101 is in communication with third-party service 140 and with client device 110 via one or more integration channels over one or more communication networks.

In an implementation, asset data service 101 writes or instructs a writing module to persist the telemetry data from each gateway to a corresponding datastore, i.e., telemetry data from a third-party vehicle gateway is persisted to a vehicle gateway datastore, and telemetry data from an OEM gateway to an OEM gateway datastore. Asset data service 101 also executes the integration scheme of the manifest by integrating the data received from gateways 121 and 123 to create an integrated or augmented dataset. The manifest includes program instructions on or accessible by asset data service 101 whereby telemetry data from multiple gateways of a single asset are integrated for storage and/or presentation. The integrated dataset is then persisted to a corresponding datastore for integrated datasets. In other implementations, asset data service 101 writes or instructs the writing module to persist the third-party vehicle gateway telemetry and the integrated telemetry data to corresponding datastores. In an alternative implementation, asset data service 101 persists only the integrated dataset to a corresponding datastore.

In still other implementations, asset data service 101 creates an integrated or augmented dataset on demand. In this scenario, asset data service 101 persists the gateway telemetry data to the corresponding datastores prior to any integration. When asset data service 101 receives a request from client device 110 to view data from an integrated dataset, asset data service 101 retrieves the telemetry data from the datastores, then integrates the data and presents the integrated dataset at client device 110.

Third-party service 140 obtains telemetry data from gateway device 121 obtained from asset 120. Third-party service 140 is in communication with asset data service 101 over one or more wired or wireless communication networks. Third-party service 140 is representative of a gateway service, i.e., any service capable of interfacing with gateways to receive telemetry data, and of storing, processing, and providing the telemetry data to customers or other such entities. Third-party service 140 is implemented on one or more server computers, of which computing device 700 in FIG. 7 is representative, and usually in the context of one or more data centers that include other equipment such as switches, routers, and storage devices that function together to provide third-party service 140. Third-party service 140 may be hosted "in the cloud," whether it be an on-premises cloud, a third-party cloud, or a hybrid cloud distributed between on-prem and off-prem clouds.

The features and functionality provided by first and third-party services 101 and 140 in the context of operational environment 100 allow customers to track various aspects of their assets and operations. Assets 120 and 130 include, but are not limited to, automotive assets (cars, trucks, etc.), shipping assets (railcars, container ships, etc.), airborne assets, construction and/or industrial assets, agricultural assets, and the like.

Client device 110 includes a computing device of an organization associated with assets 120 and 130. Client device 110 is in communication with asset data service 101 over one or more wired or wireless communication networks. Using client device 110, personnel associated with the organization can view, interact with, and otherwise experience telemetry data of assets 120 and 130 on asset data service 101.

Figure 2:
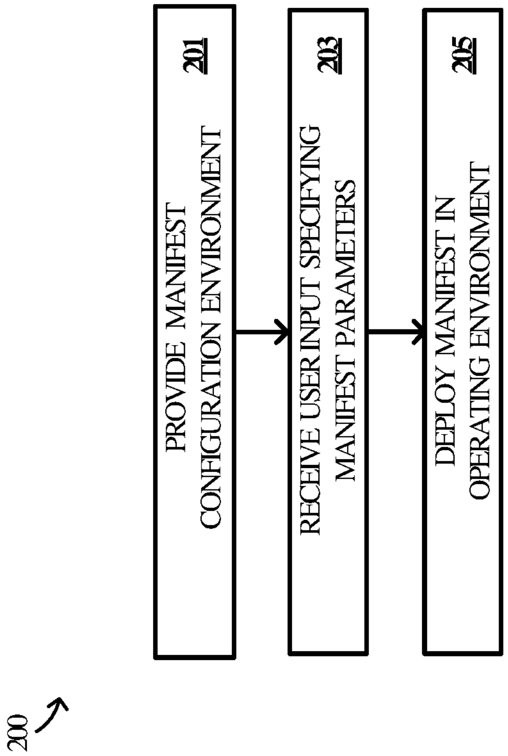
FIG. 2 illustrates an integration process in an implementation.

Asset data service 101 employs a manifest configuration process, of which manifest configuration process 200 in FIG. 2 is representative, to configure a manifest for an integration process for integrating telemetry data from multiple gateways of a single asset for storage and presentation on a client device. Referring to FIG. 2, manifest configuration process 200 may be implemented in program instructions in the context of any of the software applications, modules, components, or other such elements of a suitable operations service, such as asset data service 101. The program instructions direct the computing system(s) that provide the service to operate as follows, referring parenthetically to the steps of FIG. 2 and in the singular for the sake of clarity.

In operation, a representative computing system provides a manifest configuration environment to a client device (step 201). The manifest configuration environment comprises a user interface by which a user defines parameters for a data integration process, wherein telemetry data from two or more gateways of a single asset are integrated for storage and/or presentation. The user interacting with the client device to define the integration process may be personnel of an organization associated with the asset. From the manifest configuration environment, the computing system receives user input specifying manifest parameters (step 203). Manifest parameters can include instructions to augment, override, combine, delete, or otherwise process aspects of the telemetry data. Manifest parameters can also include instructions relating to persisting, transmitting, and/or presenting the data. After receiving user input, the computing system deploys the manifest for use in the operating environment (step 205). In the operating environment, log messages comprising asset telemetry data are received from gateway devices or from gateway services. When the computing system receives multiple log messages containing telemetry data for a single asset, the computing system processes and handles the data according to the manifest.

Figure 3:
FIG. 3 illustrates an integration process in an implementation.

Asset data service 101 also employs an integration process 300, illustrated in FIG. 3, to integrate telemetry data sourced from multiple gateways associated with a single monitored asset. Referring to FIG. 3, integration process 300 may be implemented in program instructions in the context of any of the software applications, modules, components, or other such elements of an asset data service, such as asset data service 101. The program instructions direct the computing systems that provide the service to operate as follows, referring parenthetically to the steps of FIG. 3 and with respect to a computing system in the singular for the sake of clarity.

In operation, a representative computing system receives telemetry data from a gateway device ("gateway") (step 301). The gateway, installed on or included with an asset, transmits telemetry data relating to various aspects of the operation of the asset, such as vehicle performance data, engine diagnostic data, driver activity, and so on. The gateway transmits the telemetry data to the computing device in log messages over one or more wired and/or wireless communication networks. In some examples, the computing device utilizes an application programming interface (API) to communicate with the transmitting gateway device. The computing device may submit individual queries via the API to the gateway to obtain individual log messages, or the log messages may be obtained or otherwise delivered in-bulk. Alternatively, the gateway may initiate the transfer of log messages to the computing system, either individually or in-bulk.

Upon receiving the telemetry data, the computing system persists the data to a datastore or other repository for storing data in one or more of tables, records, databases, files, or the like. The datastore may comprise a database dedicated to or associated with the particular gateway from which the data was received (step 303).

Next, the computing system identifies a manifest specifying the integration of a subset of the telemetry data with telemetry data from one or more other gateways (step 305). The manifest comprises user input which defines the integration of telemetry data when telemetry data is received from multiple gateways associated with a single asset. The manifest was previously configured in a manifest configuration environment in which a user configures an integration scheme by specifying manifest parameters. The manifest parameters comprise instructions for handling aspects of the data to create an augmented or integrated dataset. The computing system integrates the multiple sets of telemetry data into an integrated dataset according to the manifest (step 307). The integrated dataset may be persisted in, for example, a database for presentation or may be presented when integration is complete without persistence.

Figure 4:
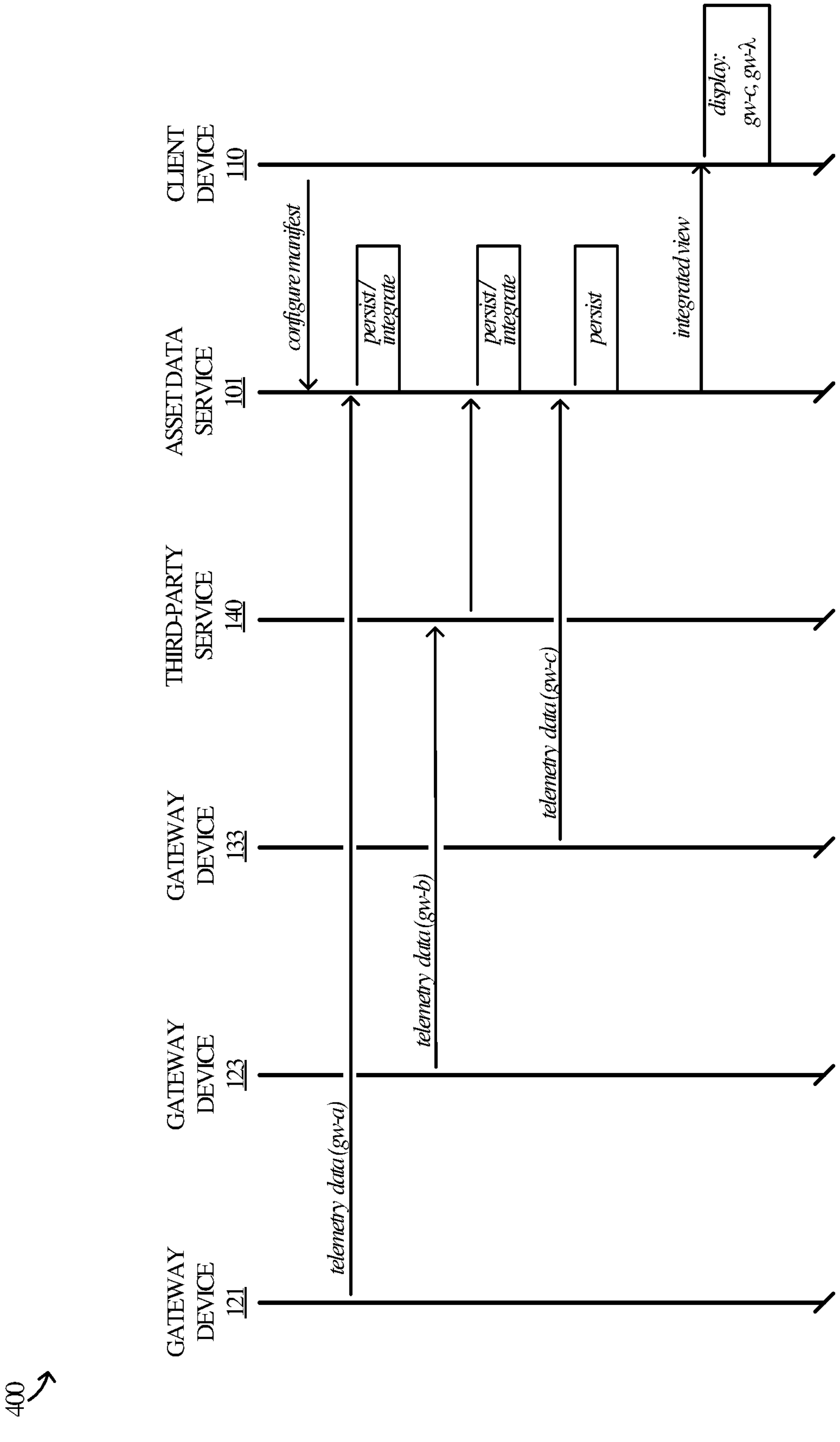
FIG. 4 illustrates an operational scenario in an implementation.

FIG. 4 illustrates operational scenario 400 representative of an application of processes 200 and 300 in the context of operational environment 100. In operation, asset data service 101 is in communication with client device 110 of or associated with an organization operating at least assets 120 and 130. Assets 120 and 130 may comprise vehicles, aircraft, or watercraft the operational and/or performance data of which is tracked and monitored by the organization. Personnel associate with the organization, interfacing with an application on client device 110, make selections, provide user input, or otherwise configure details of a data integration associated with gateway devices 121 and 123. The configuration information is supplied to asset data service 101, to be applied during normal operations.

In operation, asset gateways 121 and 123 obtain telemetry data from the asset to which they are attached and upload the telemetry data to their respective services. Asset gateway 121 communicates its telemetry data for "gateway a" to third-party service 140, while gateway device 133 communicates its telemetry data for "gateway b" to asset data service 101. Gateway device 133 also transmits telemetry data to asset data service 101. The logs from gateway-a are transferred from the third-party service to asset data service 101 via an integration channel, while the logs from gateway-b are received directly by the service.

The logs are processed on a per-log basis by asset data service 101 to determine whether they are subject to an integration. Asset data service 101 identifies an integration schema for integrating the telemetry data of asset 120 in the manifest and applies the integration scheme to create an integrated dataset integrating data from gateway 121 with data from gateway 123. Here, it is assumed for exemplary purposes that the logs from gateway-a and gateway-b are subject to an integration, while the logs from gateway-c are not. Accordingly, the data from the logs sourced by gateway-a and gateway-b is persisted to storage in an integrated format and optionally in a non-integrated format. In contrast, the data from gateway-c is not subject to an integration and so is merely persisted in a non-integrated format. Asset data service 101 may then service the integrated data (as well as non-integrated data) to client device 110 (or any other device) to be displayed in a user interface. Referring back to FIG. 1 in an example, view 111 illustrates a view of a user interface for telemetry data for assets 120 and 130 after the integration of the telemetry data for asset 120. In view 111, "GWD-lambda" represents the integrated dataset for asset 120.

Figure 5:
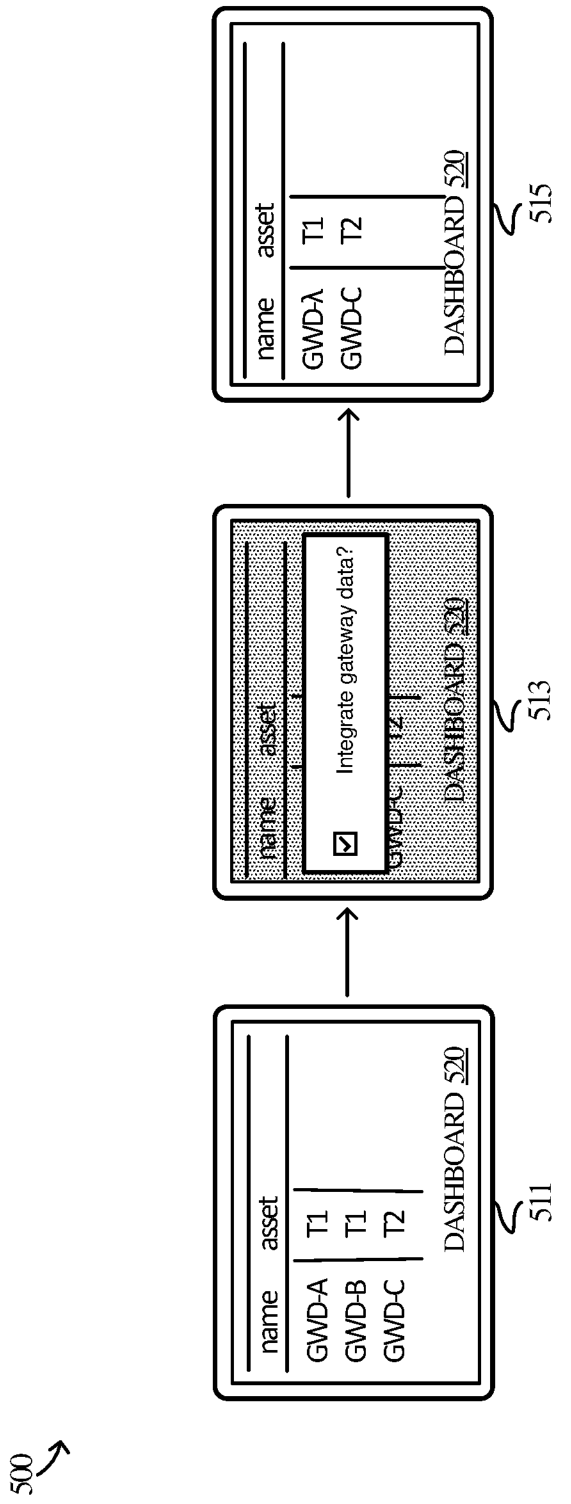
FIG. 5 illustrates dashboard views associated with an integration process in an implementation.

FIG. 5 illustrates various views of dashboard 520 displayed on a client device, of which client device 110 of FIG. 1 is representative. Views 511-515 illustrate an implementation wherein a user initiates the integration of data from multiple gateways of an asset, such as asset 120 of FIG. 1. In view 511, dashboard 520 displays gateways associated with assets T1 and T2, whereby a user can interact with the telemetry data of a particular gateway of a particular asset. In view 511, "GWD-A" and "GWD-B" represent sets of telemetry data received from the corresponding gateways onboard asset T1. The computing system identifies a manifest previously defined for integrating telemetry data for the multiple gateways of assets such as T1. In view 513, dashboard 520 enables the user to instigate an integration of the telemetry data. Upon receiving an indication from the user to integrate datasets "GWD-A" and "GWD-B," view 515 of dashboard 520 displays dataset "GWD-lambda" comprising the integrated data of "GWD-A" and "GWD-B." In other implementations, "GWD-lambda" comprises dataset "GWD-A" augmented by data from "GWD-B." Notably, dataset "GWD-C" is the sole telemetry dataset associated with asset T2 (I.e., the telemetry dataset from the sole gateway GWD-C onboard asset T2) and is, therefore, unaffected by the integration process.

In FIGS. 6A-6D, various implementations of the operational architecture of an asset data service are illustrated. The asset data service, of which asset data service 101 of FIG. 1 is representative, comprises an integration process defined by an integration manifest deployed on and executed by the asset data service. FIGS. 6A-6D illustrate asset data services in various implementations that are representative of a collection of applications, services, micro-services, and/or other elements to provide an asset data service as proposed herein. Operational architectures 601-607 include a hub service 610, a log service 620, a write service 630, and a presentation service 650 each of which may be implemented as micro-services, applications, containers, or any variation or combination thereof. Log service 620 is operationally coupled to hub 610, write service 630, and presentation service 650. Write service 630 is operationally coupled to one or more datastores 641-645. Presentation service 650 presents integrated datasets to a client device, such as client device 110 of FIG. 1. The elements of operational architectures 601-607 may be implemented in the context of a data center and by one or more computing devices, of which computing device 700 is representative.

Figure 6A:
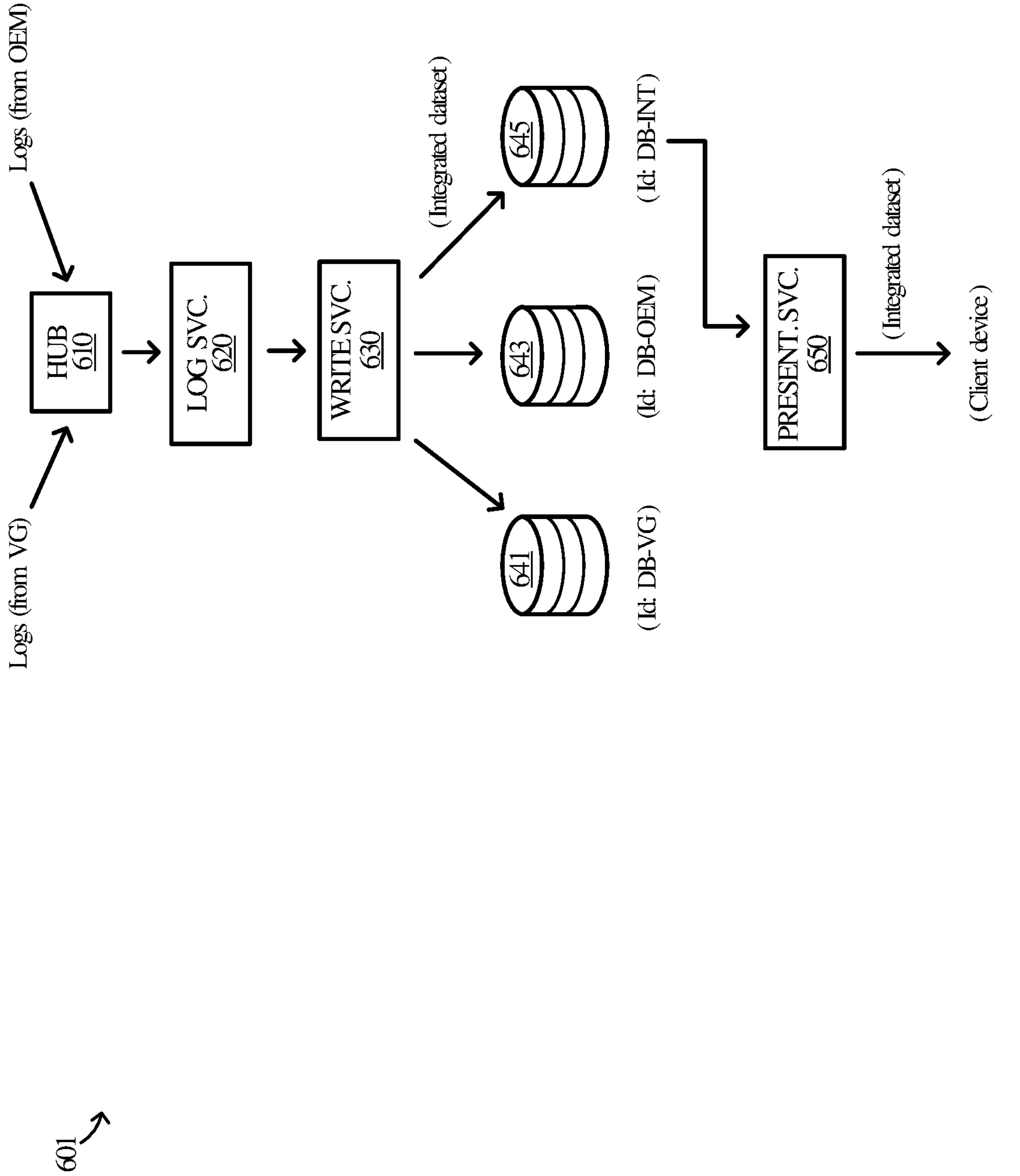
FIGS. 6A-6D illustrate operational architectures in various implementations.

FIG. 6A illustrates operational architecture 601 of an asset data service in an implementation. In operational architecture 601, hub 610 is capable of receiving log messages generated by asset gateways deployed in the field in conjunction with physical assets. Hub 610 receives log messages which include telemetry data from gateway devices onboard a single asset. The gateway devices can include an OEM device or a third-party device which is attached or otherwise integrated into the asset to receive telemetry data associated with the asset. For example, the gateway device may comprise a gateway module within or operatively coupled to an onboard computer capable of transmitting telemetry data to a gateway service. Hub 610 transmits the log messages to log service 620. Log service 620 is a computing apparatus comprising program instructions for presenting, processing, persisting, or otherwise handling gateway telemetry data. Log service 620 also comprises a manifest which includes one or more integration schemes for integrating telemetry data from multiple gateways of a single asset. Upon receiving the log messages from hub 610, log service 620 identifies parameters of the manifest defining the integration of telemetry data from the vehicle gateway and the OEM gateway and executes the integration of the data from the vehicle and OEM gateways. Log service 620 directs write service 630 to persist the telemetry datasets to corresponding dedicated datastores—vehicle gateway data is persisted to datastore 641; OEM data is persisted to datastore 643; and the integrated dataset is persisted to datastore 645. Log service 620 further directs presentation service 650 to present the integrated dataset to a client device, such as within a user interface executing on the client device upon receiving a request from the client device. By presenting the integrated dataset as if the data was produced by a single gateway, operational architecture 601 yields a cleaner user experience which can be used more efficiently than viewing each of the gateway datasets individually.

Figure 6B:
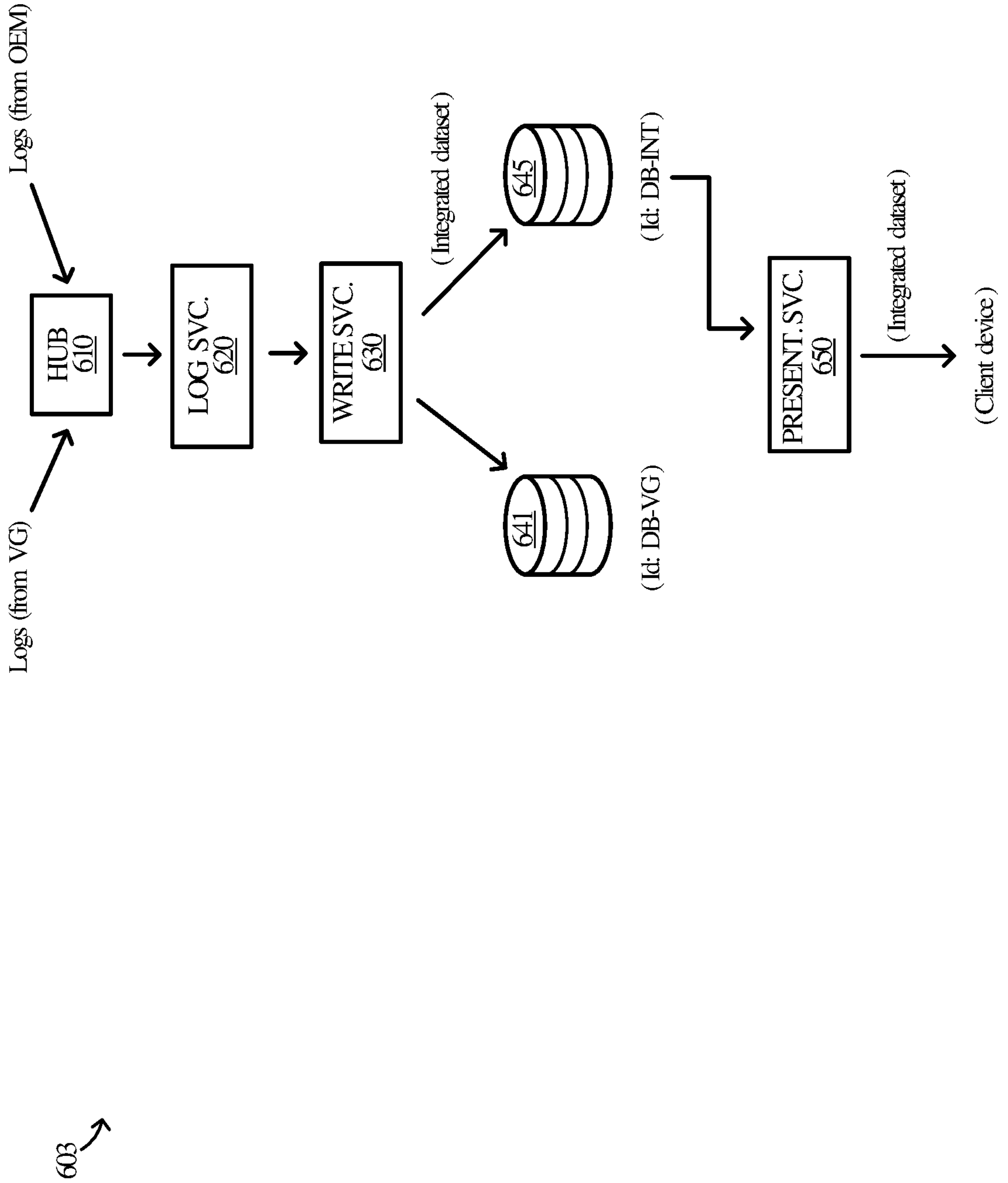

FIG. 6B illustrates operational architecture 603 of an asset data service in an implementation similar to operational architecture 601. In operational architecture 603, log service 620 directs write service 630 to write the vehicle gateway data to dedicated datastore 641, and to write the integrated dataset created from the vehicle gateway data and the OEM gateway data dedicated datastore 645. In contrast to operational architecture 601, the OEM gateway data is not persisted to a separate datastore. Log service 620 directs presentation service 650 to present the integrated dataset to a client device.

Figure 6C:
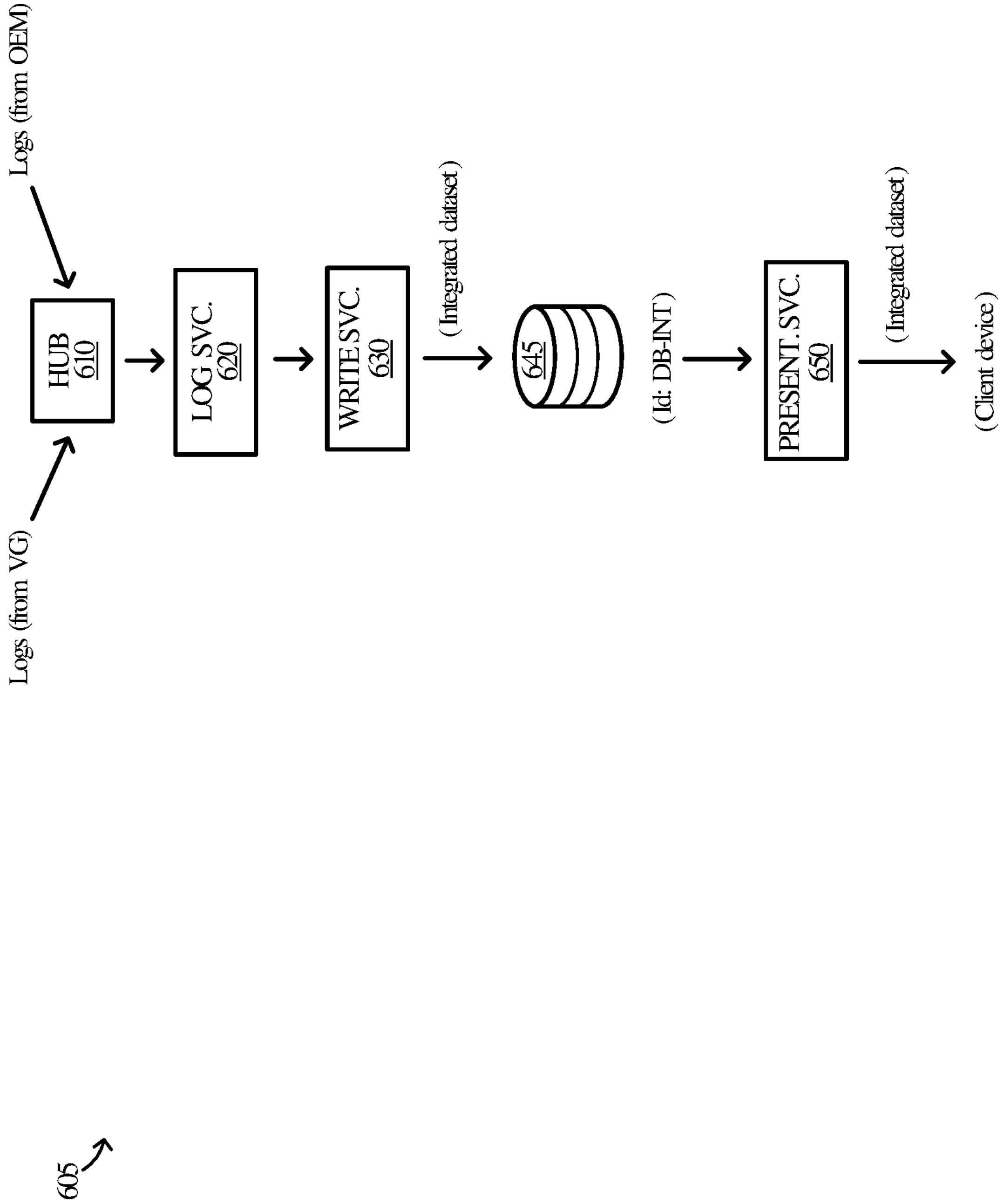

FIG. 6C illustrates operational architecture 605 of an asset data service in an implementation. In operational architecture 605, log service 620 creates an integrated dataset according to the integration manifest, wherein the integrated dataset comprises the vehicle gateway dataset augmented by aspects of the OEM gateway dataset. For example, the integrated dataset may be created by adding one or more aspects of the OEM gateway dataset to the vehicle gateway dataset or by overwriting one or more aspects of the vehicle gateway dataset with corresponding data from the OEM gateway dataset. Log service 620 directs write service 630 to write the integrated dataset to dedicated datastore 645.

Figure 6D:
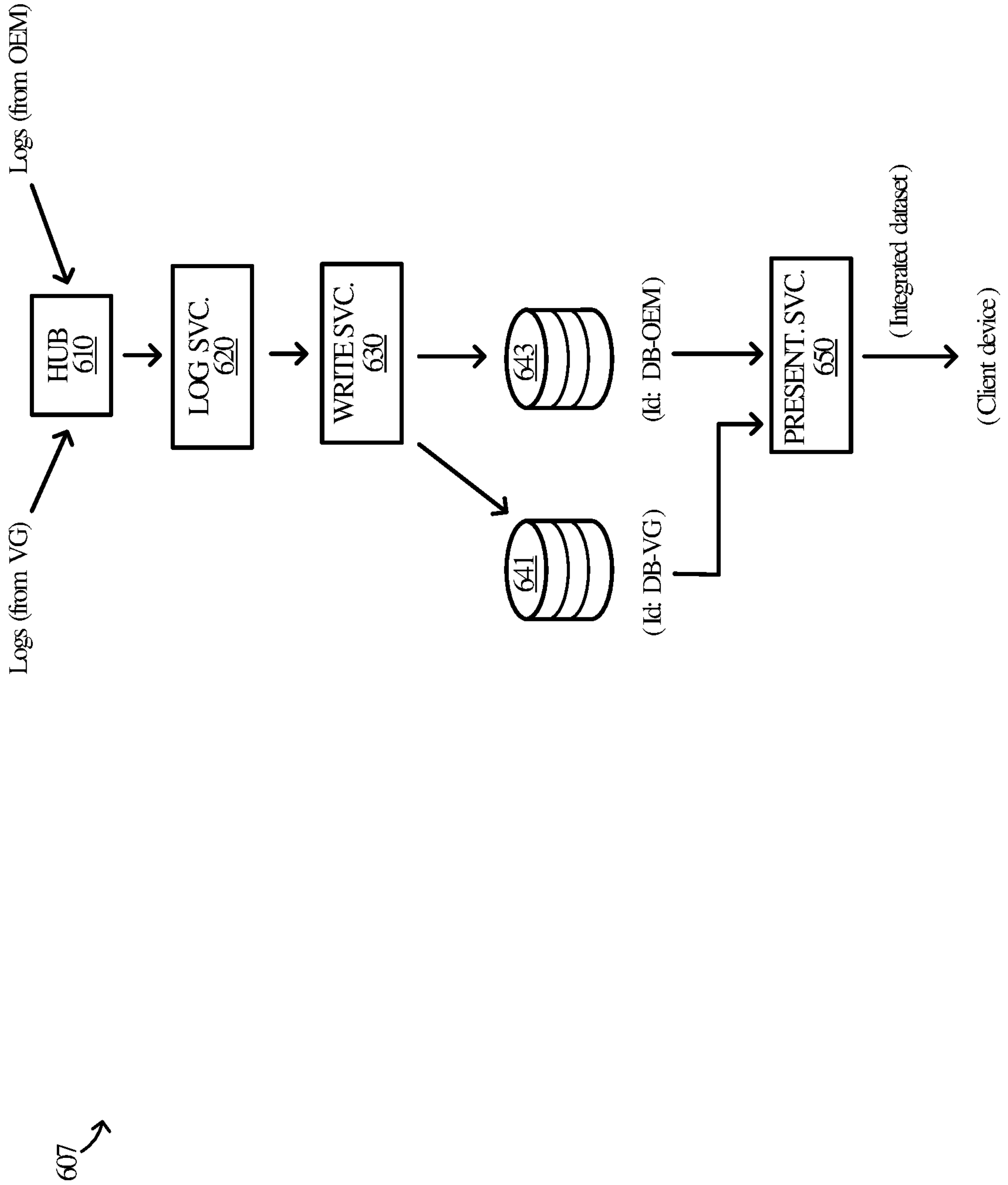

FIG. 6D illustrates operational architecture 607 of an asset data service in an implementation wherein the gateway data from multiple sources is integrated on demand. In operational architecture 607, log service 620 directs write service 630 to persist the vehicle and OEM gateway data to their corresponding datastores 641 and 643, respectively. Upon receiving a request from a client device in communication with the asset data service, log service 620 directs presentation service 650 to integrate the vehicle and OEM gateway datasets to create and present an integrated dataset to a client device.

FIG. 7 illustrates computing device 701 that is representative of any system or collection of systems in which the various processes, programs, services, and scenarios disclosed herein may be implemented. Examples of computing device 701 include, but are not limited to, server computers, web servers, cloud computing platforms, and data center equipment, as well as any other type of physical or virtual server machine, container, and any variation or combination thereof. Examples may also include desktop and laptop computers, tablet computers, mobile computers, and wearable devices.

Computing device 701 may be implemented as a single apparatus, system, or device or may be implemented in a distributed manner as multiple apparatuses, systems, or devices. Computing device 701 includes, but is not limited to, processing system 702, storage system 703, software 705, communication interface system 707, and user interface system 709 (optional). Processing system 702 is operatively coupled with storage system 703, communication interface system 707, and user interface system 709.

Processing system 702 loads and executes software 705 from storage system 703. Software 705 includes and implements process 706, which is representative of the processes discussed with respect to the preceding Figures, such as manifest configuration process 200 and integration process 300. When executed by processing system 702, software 705 directs processing system 702 to operate as described herein for at least the various processes, operational scenarios, and sequences discussed in the foregoing implementations. Computing device 701 may optionally include additional devices, features, or functionality not discussed for purposes of brevity.

Referring still to FIG. 7, processing system 702 may comprise a micro-processor and other circuitry that retrieves and executes software 705 from storage system 703. Processing system 702 may be implemented within a single processing device but may also be distributed across multiple processing devices or sub-systems that cooperate in executing program instructions. Examples of processing system 702 include general purpose central processing units, graphical processing units, application specific processors, and logic devices, as well as any other type of processing device, combinations, or variations thereof.

Storage system 703 may comprise any computer readable storage media readable by processing system 702 and capable of storing software 705. Storage system 703 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 703 may also include computer readable communication media over which at least some of software 705 may be communicated internally or externally. Storage system 703 may be implemented as a single storage device but may also be implemented across multiple storage devices or sub-systems co-located or distributed relative to each other. Storage system 703 may comprise additional elements, such as a controller, capable of communicating with processing system 702 or possibly other systems.

Software 705 (including process 706) may be implemented in program instructions and among other functions may, when executed by processing system 702, direct processing system 702 to operate as described with respect to the various operational scenarios, sequences, and processes illustrated herein. For example, software 705 may include program instructions for implementing an integration process as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 705 may include additional processes, programs, or components, such as operating system software, virtualization software, or other application software. Software 705 may also comprise firmware or some other form of machine-readable processing instructions executable by processing system 702.

In general, software 705 may, when loaded into processing system 702 and executed, transform a suitable apparatus, system, or device (of which computing device 701 is representative) overall from a general-purpose computing system into a special-purpose computing system customized to support asset gateway services. Indeed, encoding software 705 on storage system 703 may transform the physical structure of storage system 703. The specific transformation of the physical structure may depend on various factors in different implementations of this description. Examples of such factors may include, but are not limited to, the technology used to implement the storage media of storage system 703 and whether the computer-storage media are characterized as primary or secondary storage, etc.

For example, if the computer readable storage media are implemented as semiconductor-based memory, software 705 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 707 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing device 701 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system, method or computer program product. Accordingly, aspects of the present invention may take the form of an entirely hardware implementation, an entirely software implementation (including firmware, resident software, micro-code, etc.) or an implementation combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Indeed, the included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the disclosure. Those skilled in the art will also appreciate that the features described above may be combined in various ways to form multiple implementations. As a result, the invention is not limited to the specific implementations described above, but only by the claims and their equivalents.

What is claimed is:

1. A computing apparatus comprising:

one or more computer readable storage media;

one or more processors operatively coupled with the one or more computer readable storage media;

and program instructions stored on the one or more computer readable storage media that, when executed by the one or more processors, direct the computing apparatus to at least:

receive data sourced from multiple gateway devices onboard a monitored asset, wherein the data includes first data sourced from a first gateway device of the multiple gateway devices, wherein the first gateway device is a vehicle gateway device, and second data sourced from a second gateway device of the multiple gateway devices, wherein the second gateway device is an original manufacturer equipment (OEM) gateway device;

persist the first data to a first datastore associated with the first gateway device;

identify a manifest that specifies an integration of at least a subset of the first data with the second data, wherein the manifest comprises instructions for processing the first data and the second data for integration;

integrate the subset of the first data and the second data into an integrated dataset based at least on the manifest;

persist the integrated dataset to an integrated datastore, wherein the integrated datastore is different from the first datastore associated with the first gateway device;

display, in a user interface, multiple representations of the data, wherein the multiple representations of the data comprise a first representation of the first data displayed in association with a first representation of the monitored asset and a second representation of the second data displayed in association with a second representation of the monitored asset;

receive, in the user interface, user input comprising an indication to display an integrated representation of the data sourced from the multiple gateway devices; and in response to the user input, replace, in the user interface, the multiple representations of the data with the integrated representation of the data and replace the first representation of the monitored asset and the second representation of the monitored asset with a single representation of the monitored asset.

2. The computing apparatus of claim 1 wherein, to receive the data sourced from the multiple gateway devices, the program instructions direct the computing apparatus to receive the second data directly from the second gateway device without traversing a third party.

3. The computing apparatus of claim 2 wherein the program instructions further direct the computing apparatus to at least persist the second data to one or more other datastores associated with the second gateway device, wherein each of the one or more other datastores is different from the first datastore associated with the first gateway device and from the integrated datastore.

4. The computing apparatus of claim 3 wherein, to integrate the subset of the first data and the second data into the integrated dataset, the program instructions direct the computing apparatus to at least:

read the subset of the first data from the datastore associated with the first gateway device;

read the second data from the one or more other datastores; and populate the integrated dataset with the subset of the first data and the second data.

5. The computing apparatus of claim 1 wherein, to integrate the subset of the first data and the second data into the integrated dataset, the program instructions direct the computing apparatus to persist the subset of the first data and at least a subset of the second data to the integrated datastore.

6. The computing apparatus of claim 1 wherein the first data is the same as the second data.

7. The computing apparatus of claim 1 wherein, the multiple representations of the data comprises:

a representation of the first gateway and a representation of the second gateway, and wherein the integrated representation of the data comprises a single representation of a lambda gateway.

8. A method comprising:

receiving data sourced from multiple gateway devices onboard a monitored asset, wherein the data includes first data sourced from a first gateway device of the multiple gateway devices, wherein the first gateway device is a vehicle gateway device, and second data sourced from a second gateway device of the gateway devices, wherein the second gateway device is an original manufacturer equipment (OEM) gateway device;

persisting the first data to a first datastore associated with the first gateway device;

identifying a manifest that specifies an integration of at least a subset of the first data with the second data, wherein the manifest comprises instructions for processing the first data and the second data for integration;

integrating the subset of the first data and the second data into an integrated dataset based at least on the manifest;

persisting the integrated dataset to an integrated datastore, wherein the integrated datastore is different from the datastore associated with the first gateway device;

displaying, in a user interface, multiple representations of the data, wherein the multiple representations of the data comprise a first representation of the first data displayed in association with a first representation of the monitored asset and a second representation of the second data displayed in association with a second representation of the monitored asset;

receiving, in the user interface, user input comprising an indication to display an integrated representation of the data sourced from the multiple gateway devices; and in response to the user input, replacing, in the user interface, the multiple representations of the data with the integrated representation of the data and replacing the first representation of the monitored asset and the second representation of the monitored asset with a single representation of the monitored asset.

9. The method of claim 8 wherein receiving the data sourced from the multiple gateway devices comprises receiving the second data directly from the second gateway device without traversing a third party.

10. The method of claim 9 further comprising persisting the second data to one or more other datastores associated with the second gateway device, wherein each of the one or more other datastores is different from the first datastore associated with the first gateway device and from the integrated datastore.

11. The method of claim 10 wherein integrating the subset of the first data and the second data into the integrated dataset comprises:

reading the subset of the first data from the datastore associated with the first gateway device;

reading the second data from the one or more other datastores; and populating the integrated dataset with the subset of the first data and at least a subset of the second data.

12. The method of claim 8 wherein integrating the subset of the first data and the second data into the integrated dataset comprises persisting the subset of the first data and the second data to the integrated datastore.

13. The method of claim 8 wherein the first data is the same as the second data.

14. The method of claim 8 wherein, the multiple representations of the data comprises:

a representation of the first gateway and a representation of the second gateway, and wherein the integrated representation of the data comprises a single representation of a lambda gateway.

15. One or more computer readable storage media having program instructions stored thereon that, when executed by one or more processors of one or more computing devices, direct the one or more computing devices to at least:

receive data sourced from multiple gateway devices onboard a monitored asset, wherein the data includes first data sourced from a first gateway device of the multiple gateway devices, wherein the first gateway device is a vehicle gateway device, and second data sourced from a second gateway device of the multiple gateway devices, wherein the second gateway device is an original manufacturer equipment (OEM) gateway device;

persist the first data to a first datastore associated with the first gateway device;

identify a manifest that specifies an integration of at least a subset of the first data with the second data, wherein the manifest comprises instructions for processing the first data and the second data for integration;

integrate the subset of the first data and the second data into an integrated dataset based at least on the manifest;

persist the integrated dataset to an integrated datastore, wherein the integrated datastore is different from the datastore associated with the first gateway device;

display, in a user interface, multiple representations of the data, wherein the multiple representations of the data comprise a first representation of the first data displayed in association with a first representation of the monitored asset and a second representation of the second data displayed in association with a second representation of the monitored asset;

receive, in the user interface, user input comprising an indication to display an integrated representation of the data sourced from the multiple gateway devices; and in response to the user input, replace, in the user interface, the multiple representations of the data with the integrated representation of the data and replace the first representation of the monitored asset and the second representation of the monitored asset with a single representation of the monitored asset.

16. The one or more computer readable storage media of claim 15 wherein, the multiple representations of the data comprises:

a representation of the first gateway and a representation of the second gateway, and wherein the integrated representation of the data comprises a single representation of a lambda gateway.

17. The one or more computer readable storage media of claim 15 wherein the first data is the same as the second data.

18. The one or more computer readable storage media of claim 15 wherein, to receive the data sourced from the multiple gateway devices, the program instructions direct the computing apparatus to receive the second data directly from the second gateway device without traversing a third party.

19. The one or more computer readable storage media of claim 18 wherein the program instructions further direct the computing apparatus to at least persist the second data to one or more other datastores associated with the second gateway device, wherein each of the one or more other datastores is different from the first datastore associated with the first gateway device and from the integrated datastore.

20. The one or more computer readable storage media of claim 19 wherein, to integrate the subset of the first data and the second data into the integrated dataset, the program instructions direct the computing apparatus to at least:

read the subset of the first data from the datastore associated with the first gateway device;

read the second data from the one or more other datastores; and populate the integrated dataset with the subset of the first data and the second data.

* * * * *